United States Patent [19]

Wingler

[11] Patent Number: 4,532,277

[45] Date of Patent: Jul. 30, 1985

[54] HYDROPHILIZED CELLULOSE ESTERS, PROCESS FOR THEIR PREPARATION, THEIR USE AS BIOMEDICAL MATERIALS AND CONTACT LENSES PRODUCED FROM THESE

[75] Inventor: Frank Wingler, Leverkusen, Fed. Rep. of Germany

[73] Assignee: Bayer Aktiengesellschaft, Leverkusen, Fed. Rep. of Germany

[21] Appl. No.: 565,589

[22] Filed: Dec. 27, 1983

[30] Foreign Application Priority Data

Jan. 7, 1983 [DE] Fed. Rep. of Germany ....... 3300345

[51] Int. Cl.$^3$ .................... C08L 1/10; C08L 23/08; C08L 31/04; A61F 1/00

[52] U.S. Cl. ...................................... 524/37; 524/38; 524/39; 524/40; 524/41; 523/106; 523/108; 527/300; 527/311; 527/312; 527/314; 351/160 R

[58] Field of Search ............... 523/105, 106, 108, 113; 524/37, 38, 39, 40, 41; 527/300, 311, 312, 313, 314, 315; 526/238.21; 351/160 R

[56] References Cited

U.S. PATENT DOCUMENTS 4,193,897 3/1980 Wingler et al. ..................... 523/106
4,360,635 11/1982 Alberts et al. .................. 525/54.45

*Primary Examiner*—John Kight
*Assistant Examiner*—Nathan M. Nutter
*Attorney, Agent, or Firm*—Connolly and Hutz

[57] ABSTRACT

Contact lenses and implants for human medicine can be fabricated from a polymer blend comprising 98–80% by weight of component A and 2–20% by weight of component B wherein:

component A is a cellulose ester of an aliphatic carboxylic acid with up to 40% by weight of total component A of an ethylene/vinyl acetate copolymer having 30–98% by weight, relative to ethylene/vinyl acetate, of incorporated vinyl acetate and component B is a homopolymer or copolymer of water-soluble vinyl monomers and up to 10% by weight relative to the total polymer B of multifunctional cross-linker vinyl compounds.

16 Claims, No Drawings

HYDROPHILIZED CELLULOSE ESTERS, PROCESS FOR THEIR PREPARATION, THEIR USE AS BIOMEDICAL MATERIALS AND CONTACT LENSES PRODUCED FROM THESE

BACKGROUND

The invention relates to hydrophilized polymers based on cellulose esters of aliphatic carboxylic acids. The hydrophilization according to the invention is carried out by impregnating the cellulose esters, where appropriate in the form of blends with ethylene/vinyl acetate copolymers in the solid phase or in a melt, with water-soluble vinyl monomers, and then polymerizing the vinyl monomers under the action of heat and/or light, where appropriate with the aid of radical initiators. The invention also relates to the use of hydrophilized materials of this type as biomedical materials in human or veterinary medicine, especially in ophthalmic contact optics.

A number of different hydrophilic polymers having water-absorbing capacities of 1 to about 60% by weight has already been employed in human medicine, for example as implants or as refractive materials in contact optics. In this connection, soft gels consisting of cross-linked (meth)acrylic acid oxyalkyl ester polymers or copolymers with vinylpyrrolidone, acrylic acid, methacrylic acid, acrylamide, methacrylamide or alkylsilyl esters of methacrylic acid, amongst others, are used. However, soft gels have the disadvantage that they can accumulate metabolites, infection-inducing substances and so forth, in their lattice. This has contributed to an increased use in contact optics of, instead of these soft gels, semihard materials of cellulose acetobutyrate or blends with ethylene/vinyl acetate copolymers (EVA) as is described, for example, in European Pat. No. 0,013,366. The water-absorbing capacity of cellulose esters or their blends with EVA is about 1 to 2%, depending on the content of free OH and the wettability with water is poor. To improve the compatibility with living tissue in the human biomedical sector, an improved wettability (in other words greater hydrophilicity) would be of great use. Since materials of this type are of particular interest for contact optics, it would be desirable if the materials also had at the same time high permeability to light.

BRIEF DESCRIPTION

Accordingly, the object of the present invention was to improve the hydrophilicity or wettability with water of biomedical materials based on cellulose esters of aliphatic carboxylic acids or their blends with EVA, while retaining the permeability to light. The object was achieved by impregnating the material, in the solid form or in a melt, with 2 to 20% by weight of one or more water-soluble vinyl monomers, where appropriate with the addition of 0.01 to 0.5% by weight of a radical initiator which initiates the polymerization in vinyl polymerizations, and then exposing the impregnated material in the solid form or in a melt to a temperature of 60° to 220° C. and/or to the action of light.

DETAILED DESCRIPTION

The present invention relates to polymer blends comprising
(A) 98–80% by weight of cellulose ether of an aliphatic carboxylic acid which, where appropriate, contains up to 40% by weight, relative to the total component (A), of an ethylene/vinyl acetate copolymer having 30–98% by weight, relative to EVA, of incorporated vinyl acetate and
(B) 2–20% by weight of a homopolymer or copolymer of water-soluble vinyl monomers and, where appropriate, up to 10% by weight, relative to the total polymer (B), of multifunctional vinyl compounds as crosslinkers,
the monomers of (B) having been polymerized, in the solid phase or in a melt, in (A).

The invention also relates to the contact lenses produced from the polymer blends according to the invention.

In a preferred manner according to the invention, the cellulose ester alone or blended with 1 to 30% by weight, in particular 5 to 15% by weight, of EVA is employed as component (A).

It has to be regarded as surprising that, in the hydrophilization according to the invention, materials are obtained which are compatible and do not cause scattering of light (even in the hydrated state) and in fact that the light-scattering constituents in component (A) are even decreased due to the hydrophilization. Mixtures of components (A) and polymers of type (B) which have been prepared separately are incompatible. This is shown by the decrease in mechanical stability and by the opalescence and scattering of light, especially in the hydrated state.

Cellulose esters suitable for the preparation of the materials according to the invention are cellulose esters of aliphatic carboxylic acids having 1 to 5 alkyl carbon atoms, preferably cellulose acetate, acetopropionate and acetobutyrate.

Organic cellulose esters have been known for a long time and are described, for example, in Ullmanns Enzyklopädie der technischen Chemie (Ullmann's Encyclopedia of Industrial Chemistry, published by Urban and Schwarzenberg, Munich-Berlin, 1963) in the 5th volume on pages 182–201. Suitable cellulose acetobutyrates contain, for example,
30 to 50% by weight of butyric acid,
10 to 26% by weight of acetic acid and
0.7 to 1.95% by weight of hydroxyl groups.

The use of cellulose acetobutyrates of the following composition is preferred:
35 to 47% by weight of butyric acid,
15 to 21% by weight of acetic acid and
0.8 to 1.7% by weight of hydroxyl groups.

Suitable cellulose acetopropionates contain, for example,
30 to 63.5% by weight of propionic acid,
1 to 12% by weight of acetic acid and
1.2 to 1.95% by weight of hydroxyl groups.

Cellulose acetopropionates preferably have the following composition:
40 to 60% by weight of propionic acid,
3 to 8% by weight of acetic acid and
1.5 to 1.8% by weight of hydroxyl groups.

The relative viscosities ($\eta_{rel}$) at 25° C. of 2% solutions in acetone of the aliphatic cellulose esters used are preferably between 3.5 and 5.0, and particularly preferably between 4.0 and 4.5.

The blends of cellulose esters and EVA suitable as component (A) according to the invention are known per se (European Pat. No. 0,003,971 and European Pat. No. 0,013,366). The EVA copolymers can be prepared by the known processes of high and medium pressure synthesis, where appropriate in solvents, such as tert.-butanol. They have a content of vinyl acetate of from 30 to 98% by weight, preferably from 60 to 80% by weight.

As a rule, the ethylene/vinyl acetate copolymers prepared by the process of high pressure synthesis have values of the melt index, by the method of DIN 53 735 at 190° C. and a pressure of 2.16 kp, between 0.1 and 100 g, preferably between 1.0 and 10 g, in particular 4.5 to 6 g. The intrinsic viscosities measured in tetralin at 120° C. are generally between 0.6 and 1.5 dl/g. The molecular weights measured by the light scattering method are preferably between 50,000 and about 1 million. The non-uniformity U defined by the relation $(M_w/M_n)-1$ (G. Schulz, Z.phys.Chem. (B) 43 (1939) pages 25–34) is preferably in the range from 1.6 to 30. These copolymers are preferably soluble in hot hydrocarbons.

The ethylene/vinyl acetate copolymers prepared by the process of solution or emulsion polymerization, which copolymers contain 30 to 98% by weight of a vinyl acetate, preferably 60 to 80% by weight of a vinyl acetate, have values for the melt index (190° C.-2.16 kp) which can be greater than 100 g, but the range of the melt index is preferably below 15 g, and is especially between 0.5 and 5 g. The molecular weights measured by light scattering are preferably between 40,000 and 1 million. As a rule, the non-uniformity U is 1 to 6. The copolymers are soluble in hydrocarbons and alcohols and preferably have intrinsic viscosities in toluene between 0.5 and 2.5 dl/g.

It is possible, if desired, for the ethylene/vinyl acetate copolymers to be completely or partially hydrolized.

The known disadvantageous effect of so-called plasticizer migration does not occur with the mixtures of polymers of organic cellulose esters and ethylene/vinyl acetate copolymers, since, in processing the mixture, the addition of plasticizers and similar auxiliaries is unnecessary. Thus mixtures of this type are particularly well suited for uses in which physiological compatibility matters.

The blends of organic cellulose esters and ethylene/vinyl acetate copolymers are prepared by thoroughly mixing the components. All known mixing processes can be used for this purpose, such as, for example, mixing in roll mills or screw extruders. The blends of organic cellulose esters and ethylene/vinyl acetate copolymers to be used according to the invention can be processed without difficulty, continuously and discontinuously, in known extruders and injection moulding machines to produce granules or moulded articles, such as lenses, tubes or joint replacement parts, and they show soft flow in these processes.

Suitable water-soluble vinyl monomers for the preparation of the polymer (B) are preferably those of the formula

in which
R represents H or $CH_3$,
R' denotes H, $CH_3$ or $C_2H_5$ and
A represents an optionally branched alkylene radical having 1 to 4 C atoms.

Preferred examples of monomers of this type are as follows:
2-hydroxyethyl acrylate, 2-hydroxypropyl acrylate, 3-hydroxypropyl acrylate, 4-hydroxybutyl acrylate, methoxymethyl acrylate, ethoxymethyl acrylate, 2-methoxyethyl acrylate, 2-ethoxyethyl acrylate and 2-hydroxyethyl methacrylate.

Another water-soluble vinyl monomer which is preferred according to the invention is vinylpyrrolidone.

Examples of other water-soluble monomers which can be used according to the invention are acrylic acid, methacrylic acid, acrylamide, methacrylamide and diacetoneacrylamide.

The component (A) is impregnated with the monomers, which are detailed under (B), in the solid phase by applying the monomers to a powder or granules of (A) and then allowing them to diffuse in, where appropriate at a slightly elevated temperature of 25° to 80° C. and under pressures from atmospheric pressure to about 3 bar of superatmospheric pressure. In this process, the mixture can be stirred or agitated in mixing devices for powders or granules, such as internal mixers or gyratory mixers. Another possibility consists of impregnation in a melt. In this process, the polymer (A) is fused, preferably at 150° to about 220° C., in suitable high-viscosity devices, such as screw machines, kneaders, etc. and the monomers from group (B) are metered in under pressure (for example about 100 bar).

For the subsequent polymerization, initiators which initiate radical chain polymerisation can be added to the monomers before they are introduced into (A). These initiator, include compounds which thermally decompose into radicals, such as azo compounds, percarbonates, perketals, peroxides, hydroperoxides, branched and sterically hindered hydrocarbons, silyl compounds, symmetrical aliphatic azo compounds, such as azoisobutyrodinitrile, azobis-2-methylvaleronitrile, 1,1'-azobis-1-cyclohexanonitrile and alkyl 2,2'-azobisisobutyrates; diacyl peroxides, such as, for example, acetyl, propionyl or butyryl peroxide, benzoyl peroxide and benzoyl peroxides which are substituted in the aromatic nucleus with 1 to 2 chlorine, bromine, nitro, methyl or methoxyl groups, and lauroyl peroxide; symmetrical peroxydicarbonates, such as, for example, diethyl, diisopropyl, dicyclohexyl and dibenzyl peroxydicarbonate; tert.-butyl peroctoate or tert.-butyl phenylperacetate; and peroxycarbamates, such as tert.-butyl N-(phenylperoxy)carbamate dilauryl peroxide, dibenzoyl peroxide, diacetyl peroxide, dicumyl peroxide, di-tert.-butyl peroxide or cumene hydroperoxide.

Photoinitiators decompose on irradiation with light into radical fragments which initiate the polymerization. Examples of suitable photoinitiators are benzoin and benzoin derivatives of the formula (I)

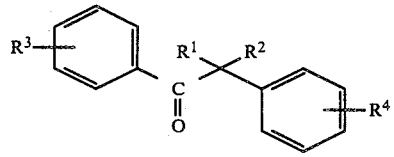

in which
$R^1$ represents —O—Y or —S—Y and
Y denotes hydrogen, trimethylsilyl, $C_1$-$C_{18}$-alkyl, $C_6$-$C_{15}$-aryl or $C_7$-$C_{15}$-aralkyl,
$R_2$ represents hydrogen, $C_1$-$C_{18}$-alkyl, $C_6$-$C_{15}$-aryl, $C_7$-$C_{15}$-aralkyl, carboxyl or $CH_2$—O—Z,
Z is hydrogen or the acid radical of a carboxylic acid or a sulphonic acid and $R^3$ and $R^4$ denote hydrogen, $C_1$–$C_4$-alkyl, halogen, such as F, Cl, Br and I or —O—R'' (R'' is $C_1$–$C_{18}$-alkyl); benzophenone and benzophenone derivatives of the formula (II)

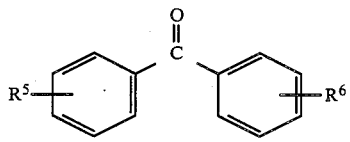

in which $R^5$ represents $CH_2$—X, CH—$X_2$ or $CX_3$,
$R^6$ represents H, $CH_3$, $CH_2$—X, CH—$X_2$ or $CX_3$ and X denotes chlorine, bromine or iodine.

The other photoinitiators known from the literature can also be equally used, such as aromatic sulphochlorides, phenacyl bromide, aromatic disulphides or anthraquinone derivatives.

Further examples of suitable initiators of these types are described in German Published Specifications Nos. 1,769,168, 1,769,853, 1,769,854, 1,807,297, 1,807,301, 1,919,678, 1,949,010 and in German Published Specification Nos. 1,694,149 (compare also J. Kosar "Light-Sensitive Systems", published by Wiley, New York 1965).

The initiators can be added to the monomers or mixture of monomers in amounts from 0.01 to about 0.5% by weight.

The polymerization is then carried out in the solid or molten phase under the action of temperatures from 25° to about 220° C. or of light, under pressures from atmospheric pressure to about 100 bar of superatmospheric pressure. Irradiation with visible or UV light is especially effective, for example by the sun, artificial fluorescent tubes or high-pressure mercury lamps.

Polymerization in the melt is carried out, for example, in polymerization screws or kneaders. The melt is then extruded, cooled down and granulated. It is advisable to remove residual monomers and decomposition products of the initiator from the biomedical material by dialysis with water using known processes. The materials are then dried and can be processed by conventional techniques of processing thermoplastics, such as injection molding, calendering, compression molding or machining, to give molded articles, films, tubes, unmachined and semifinished items.

It is also possible according to the invention to prepare thermosetting plastics. For this purpose, the molded article or the film is molded from the polymer (A), the latter is impregnated with the monomers, which additionally contain multifunctional, copolymerizing vinyl compounds, possibly with the addition of an initiator, and exposed, as the moulded article, block or film, to the action of heat or light as described above.

The multifunctional, copolymerizing vinyl compounds lead to crosslinking polymerization. The thermosetting plastic materials thus resulting have a particularly high mechanical stability, especially at elevated temperature and they undergo only slight changes in shape on hydration. Multifunctional vinyl compounds acting as crosslinkers are, inter alia, ethylene glycol di(meth)acrylate, diethylene glycol di(meth)acrylate, tri- and tetraethylene glycol di(meth)acrylate, 1,4-butanediol di(meth)acrylate, trimethylonepropane di- and tri(meth)acrylate, tripropylene glycol di(meth)acrylate, 3-methyl-1,5-pentanediol di(meth)acrylate, pentaerythritol tri- and tetra(meth)acrylate, dihydrodicyclopentadienyl mono(meth)acrylate, vinyl(metha)acrylate, allyl(meth)acrylate, butanediol divinyl ether, divinylethyleneurea, divinylpropyleneurea, triallyl cyanurate, triallyl isocyanurate, divinyl adipate, diethylene glycol diallyl carbonate, reaction products of (meth)acrylic acid with polyepoxide compounds such as, for example, with triglycidyl isocyanurate, triglycidyl cyanurate or bisphenol A diglycidyl ether. Divinyl phthalate and divinyl benzene are also excellent crosslinkers.

Additional copolymerizing compounds acting as crosslinkers are allyl acrylate or methacrylate, hydroxymethylnorbornene(meth)acrylate and tricyclodecenyl acrylate or methacrylate. The crosslinkers mentioned are preferably added in amounts from 0.5 to 5% by weight to the water-soluble vinyl monomers.

The materials according to the invention have a water-absorbing capacity of from 2 to 15% by weight and they remain completely transparent even in the hydrated form. The materials are used, for example, as implants in human medicine, for artificial joints, blood vessels, valves and closures, drainage tubes, etc. Because of their transparency, the materials according to the invention are of particular interest for ophthalmic medicine, for example, as implanted lenses in aphacia, as contact optical materials, scleral dishes, corrective contact lenses, etc. Due to the higher hydrophilicity and improved wettability with water compared with unmodified cellulose esters, the polymer blends according to the invention also show, when used as material for contact lenses, an improved compatibility with living tissue, and a greater degree of comfort when worn, and they have a lower tendency to form coatings and deposits than do conventional unmodified cellulose ester materials.

EXAMPLE 1

(Solid-phase polymerization, see Table No. 1)

x g of cellulose acetobutyrate/EVA blend ($A^1$) in the form of cylindrical granules, having a hydroxyl content of 1.7% by weight, a butyric acid content of 46.5% by weight (in each case as bound ester) relative to the cellulose ester butyrate component, and a content of 10% by weight of EVA with 70% by weight of incorporated vinyl acetate, were mixed, in a glass bottle, with y g of the water-soluble monomers (B) and z g of initiator (C), and the bottle was sealed pressure-tight and milled overnight on a roll mill. The bottle was then allowed to stand in a heating cabinet at 40° C. for 24 hours. The granules were fused in sealed glass tubes under nitrogen and heated in an oil bath or exposed to the light from a UV fluorescence tube as can be bought for suntan equipment. The tubes were opened and the uptake of water was determined by storage in distilled water for 24 hours.

Contact lenses were compression moulded, on quartz dies at 160° C., from the granules which had been hydrated in physiological saline, and these were placed on the eyes of rabbits. After 40 days of uninterrupted wearing, no vascularization (development of vessels) was observed for any material, and the conjunctiva remained free of irritation. The wearing comfort was compared with untreated contact lens material of a cellulose acetobutyrate blend in a right/left trial on selected test subjects. The subjective tolerance was found to be better in 74% of the test subjects. In particular, compared with untreated material, the formation of deposits after 4 weeks of use in test subjects who tend to form heavy deposits on semi-hard contact lenses was lower, but this can be removed with conventional contact lens cleansing agents. A lower degree of light scattering compared with unmodified material was observed with a slit lamp. Contact lenses made of this material show a lower degree of dazzle for car drivers at night time, and this is attributed to the lower degree of light scattering.

EXAMPLE 3

(Solid-phase polymerization, see Table 2)

x g of cellulose acetobutyrate/EVA blend ($A^2$) in the form of cylindrical granules, having a hydroxyl content of 1.7% by weight, a butyric acid content of 46.5% by weight and a content of acetic acid of 20% by weight (in each case as bound ester) were mixed, in a glass bottle, with y g of the water-soluble monomers (B) and z g of initiator (C), and the bottle was sealed pressure-

TABLE 1

| Test | x g ($A^1$) | y g (B) | z g (C) | Polymerization (hours/°C.) | Polymerization by UV light (hours/30° C.) | Water absorbed (% by weight) |
|---|---|---|---|---|---|---|
| a | 95 | 5 AOE | 0.025 AIBN | 16/90 | — | 3.0 |
| b | 90 | 10 AOE | 0.050 AIBN | 16/90 | — | 4.5 |
| c | 85 | 15 AOE | 0.075 tBPO | 24/110 | — | 4.7 |
| d | 95 | 5 AOB, 0.05 EGDM | 0.025 BIP | — | 48 | 3.0 |
| e | 85 | 15 VP | 0.075 tBPO | 24/110 | — | 4.2 |
| f | 95 | 5 AOE | 0.025/tBPO | 24/110 | — | 2.5 |

AOE: 2-hydroxyethyl acrylate
VP: Vinylpyrrolidone
BIP: Benzoin isopropyl ether
AOP: 2-hydroxypropyl acrylate
AEOE: 2-ethoxyethyl acrylate
AOB: 4-hydroxybutyl acrylate
tBPO: tert.-butyl peroctoate
EGDM: Ethylene glycol dimethacrylate
AIBN: Azodiisobutyrodinitrile

EXAMPLE 2

(Polymerization in the melt)

2 kg/h of cellulose acetobutyrate blend having the composition as in Example 1 are fed into and fused in a 1-shaft laboratory screw (Brabender Plastograf). A mixture of 0.25 kg of 4-hydroxybutyl acrylate(1,4-butane-diol monoacrylate) and 5 g of di-tert.-butyl peroxide is pumped in each hour behind the feed-in zone at 180° C. using a piston pump.

The other sections of the screw were heated to 220° C. The emerging melt was extruded, cooled down and granulated. The water-absorbing capacity was 4.2% by weight. Contact lenses made of this material passed the 40-day rabbit test and again showed, in the test on humans, an improved subjective tolerance and a lower degree of light scattering with a slit lamp than did the unmodified material.

tight and milled overnight on a roll mill. The bottle was then allowed to stand in a heating cabinet at 40° C. for 24 hours. The granules were fused in sealed glass tubes under nitrogen and heated in an oil bath or exposed to the light from a UV fluorescence tube as can be bought for suntan equipment. The tubes were opened and the uptake of water was determined by storage in distilled water for 24 hours.

Contact lenses were compression molded, on quartz dies at 160° C., from the granules which had been hydrated in physiological saline, and these were placed on the eyes of rabbits. After 40 days of uninterrupted wearing, no vascularization was observed for any material, and the conjunctiva remained free of irritation. The wearing comfort was compared with untreated contact lens material of cellulose actobutyrate in a right/left trial on selected test subjects. The subjective tolerance was found to be better in 74% of the test subjects. In particular, compared with untreated material, the formation of deposits after 4 weeks of use in test subjects who tend to form heavy deposits on semi-hard contact lenses was lower, but this can be removed with conventional contact lens cleansing agents.

TABLE 2

| Test | x g ($A^2$) | y g (B) | z g (C) | Polymerization (hours/°C.) | Polymerization by UV light (hours/30° C.) | Water absorbed (% by weight) |
|---|---|---|---|---|---|---|
| a | 95 | 5 AOE | 0.025 AIBN | 16/90 | | 2.7 |
| b | 90 | 10 AOE | 0.050 AIBN | 16/90 | | 4.2 |
| c | 85 | 15 AOP | 0.075 tBPO | 24/110 | | 4.3 |
| d | 95 | 5 AOB, 0.05 EGDM | 0.025 BIP | | 48 | 2.1 |
| e | 85 | 15 VP | 0.075 tBPO | 24/110 | | 2.8 |

TABLE 2-continued

| Test | x g (A²) | y g (B) | z g (C) | Polymerization (hours/°C.) | Polymerization by UV light (hours/30° C.) | Water absorbed (% by weight) |
|---|---|---|---|---|---|---|
| f | 95 | 5 AEOE | 0.025 tBPO | 24/110 | | 1.8 |

AOE: 2-hydroxyethyl acrylate
VP: Vinylpyrrolidone
BIP: Benzoin isopropyl ether
AOP: 2-hydroxypropyl acrylate
AEOE: 2-ethoxyethyl acrylate
AOB: 4-hydroxybutyl acrylate
tBPO: tert.-butylperoctoate
EGDM: Ethylene glycol dimeth-acrylate
AIBN: Azodiisobutyrodinitrile

EXAMPLE 4
(Polymerization in the melt)

2.5 kg/h of cellulose acetobutyrate having the composition as in Example 3 were fed into and fused in a 1-shaft laboratory screw (Brabender Plastograf). A mixture of 0.25 kg of 4-hydroxybutyl acrylate (1,4-butanediol monoacrylate) and 5 g of di-tert.-butyl peroxide was pumped in each hour behind the feed-in zone at 180° C. using a piston pump. The other sections of the screw were heated to 220° C. The emerging melt was extruded, cooled down and granulated. The water-absorbing capacity was 3.8% by weight. Contact lenses made of this material passed the 40-day rabbit test and again showed, in the test on humans, an improved subjective tolerance than did the unmodified material.

What is claimed is:

1. A polymer blend comprising 98–80% by weight of component A and 2–20% by weight of component B wherein:
   component A is a cellulose ester of an aliphatic carboxylic acid with up to 40% by weight of total component A of an ethylene/vinyl acetate copolymer having 30–98% by weight, relative to ethylene/vinyl acetate, of incorporated vinyl acetate and
   component B is a homopolymer or copolymer of acrylic acid, methacrylic acid, acrylamide, methacrylamide, diacetone-acrylamide, vinyl pyrrolidone, or compounds of the formula

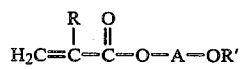

wherein
   R is H or CH₃,
   R' is H, CH₃ or C₂H₅ and
   A is a straight-chain or branched alkylene moiety having 1 to 4 carbon atoms; and up to 10% by weight relative to the total polymer B of multifunctional crosslinker vinyl compounds.

2. The polymer blend according to claim 1 wherein component A consists essentially of pure cellulose ester.

3. The polymer blend according to claim 1 wherein component A is a blend of
   99 to 70% by weight of cellulose ester and
   30 to 1% by weight of ethylene/vinyl acetate copolymer.

4. The polymer blend according to claim 3 wherein component A is a blend of
   95 to 85% by weight of cellulose ester and
   15 to 5% by weight of ethylene/vinyl acetate polymer.

5. The polymer blend according to claim 1 wherein the cellulose ester is a cellulose acetobutyrate comprising
   30 to 50% by weight of butyric acid moieties,
   10 to 26% by weight of acetic acid moieties, and
   0.7 to 1.95% by weight of hydroxyl moieties.

6. The polymer blend according to claim 5 wherein component A consists essentially of pure cellulose ester.

7. The polymer blend according to claim 5 wherein component A is a blend of
   99 to 70% by weight of cellulose ester and
   30 to 1% by weight of ethylene/vinyl acetate copolymer.

8. The polymer blend according to claim 7 wherein component A is a blend of
   95 to 85% by weight of cellulose ester and
   15 to 5% by weight of ethylene/vinyl acetate copolymer.

9. The polymer blend according to claim 1 wherein the ethylene/vinyl acetate copolymer has a vinyl acetate content of 60 to 80% by weight.

10. The polymer blend according to claim 1 wherein the water-soluble vinyl monomers of the homopolymer or copolymer of component B are vinylpyrrolidone or compounds of the formula

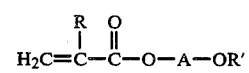

wherein
   R is H or CH₃,
   R' is H, CH₃ or C₂H₅ and
   A is a straight-chain or branched alkylene moiety having 1 to 4 carbon atoms.

11. Process for the preparation of polymer blends according to claim 1 which comprises impregnating 98 to 80% by weight of component A with
   2 to 20% by weight of a water-soluble vinyl monomer and then the impregnated material is exposed to the action of light.

12. Process according to claim 11 wherein the impregnated material additionally contains 0.01 to 0.5% by weight of a radical initiator.

13. Process according to claim 11 wherein the impregnated material is exposed to a temperature of 60° to 220° C.

14. Process according to claim 11 wherein the impregnated material is exposed in the form of a melt.

15. Process according to claim 11 wherein the impregnated material is exposed in solid form.

16. As an article of manufacture, lenses to be worn in direct eye contact and comprising a polymer blend according to claim 1.

* * * * *